United States Patent [19]
Thomas et al.

[11] Patent Number: 5,868,507
[45] Date of Patent: Feb. 9, 1999

[54] PLOTTER HAVING SPROCKETS FOR DRIVING SHEETS RELATIVE TO A TOOL CARRIAGE AND A FIXED SHEET SUPPORT EXTENDING BETWEEN THE SPROCKETS

[75] Inventors: Michael J. Thomas, West Hartford; Joseph W. Stempien, Newington, both of Conn.

[73] Assignee: Gerber Scientific Products, Inc., Manchester, Conn.

[21] Appl. No.: 826,367

[22] Filed: Apr. 9, 1997

[51] Int. Cl.⁶ .................................................. B41J 11/26
[52] U.S. Cl. ................... 400/616; 400/616.3; 400/656
[58] Field of Search ................... 400/616, 691, 400/616.3, 662, 659, 656

[56] References Cited

U.S. PATENT DOCUMENTS

| | | | |
|---|---|---|---|
| 3,681,779 | 8/1972 | Darnell | 346/136 |
| 3,759,433 | 9/1973 | Gerber | 226/54 |
| 3,854,644 | 12/1974 | Gerber | 226/79 |
| 3,857,525 | 12/1974 | Gerber et al. | 242/57.1 |
| 3,872,369 | 3/1975 | Rich | 318/603 |
| 3,877,035 | 4/1975 | Miller et al. | 346/49 |
| 3,949,856 | 4/1976 | Ulber et al. | 197/133 |
| 4,228,938 | 10/1980 | Monma et al. | 226/9 |
| 4,467,525 | 8/1984 | Logan et al. | 33/18 |
| 4,708,901 | 11/1987 | Wood | 428/131 |
| 4,739,344 | 4/1988 | Sullivan et al. | 346/76 |
| 4,745,683 | 5/1988 | Wood | 33/18.1 |
| 4,759,646 | 7/1988 | Piatt | 400/88 |
| 4,768,410 | 9/1988 | Wood | 83/63 |
| 4,811,038 | 3/1989 | Gordon et al. | 346/160 |
| 4,834,276 | 5/1989 | Logan | 226/76 |
| 4,867,363 | 9/1989 | Wood et al. | 226/76 |
| 4,895,287 | 1/1990 | Wood et al. | 226/76 |
| 4,915,526 | 4/1990 | Westly et al. | 400/642 |
| 4,948,282 | 8/1990 | Koike et al. | 400/616.2 |
| 5,131,272 | 7/1992 | Minei et al. | 73/431 |
| 5,315,690 | 5/1994 | Gordon et al. | 395/104 |
| 5,315,928 | 5/1994 | Bocinski et al. | 400/656 |
| 5,366,306 | 11/1994 | Mizutani et al. | 400/691 |
| 5,537,135 | 7/1996 | Hevenor et al. | 347/171 |
| 5,575,574 | 11/1996 | Merterns | 400/124.01 |

FOREIGN PATENT DOCUMENTS

| | | |
|---|---|---|
| 0539314 A1 | 9/1902 | European Pat. Off. . |
| 3541441A1 | 11/1909 | European Pat. Off. . |
| 2016349 A | 3/1979 | European Pat. Off. . |
| 0469249 A1 | 5/1991 | European Pat. Off. . |
| 0493708 A2 | 12/1991 | European Pat. Off. . |
| 0 535 932A2 | 4/1993 | European Pat. Off. . |
| 0 607 539A2 | 7/1994 | European Pat. Off. . |
| 57-002785 | 1/1982 | Japan . |
| 57-46896 | 3/1982 | Japan . |
| 58-055266 | 4/1983 | Japan . |
| 59-098881 | 6/1984 | Japan . |
| 60-137757 | 7/1985 | Japan . |
| 60-253566 | 12/1985 | Japan . |
| 592094 | 9/1947 | United Kingdom . |
| WO88/01556 | 3/1988 | WIPO ............ B26D 1/45 |

OTHER PUBLICATIONS

Gerber Scientific Products, Inc., *Gerber 1996 Product Catalog*, pp. 13–16, 1996.

*Primary Examiner*—John Hilten
*Attorney, Agent, or Firm*—McCormick, Paulding & Huber

[57] ABSTRACT

In a sprocket-driven plotter, a pair of drive sprockets are spaced apart from each other and keyed to a common sprocket shaft, and a drive motor is drivingly connected to the shaft to rotatably drive the sprockets, and in turn move the sheets engaged by the sprockets relative to a tool carriage for plotting by drawing lines, cutting or performing a variety of other operations on the sheets. A sheet support defines an arcuate support surface fixedly secured to the apparatus, and extending in its elongated direction between the sprockets for conformably contacting the laterally-extending section of each sheet engaged by the sprockets. The arcuate support surface defines a plurality of relatively raised or outermost surface areas, and each raised surface area is defined by an arcuate surface segment extending in the axial direction of the support for contacting and supporting the sheets. Corresponding recessed surface areas are formed between the raised surface areas for reducing friction between the sheets and support.

33 Claims, 8 Drawing Sheets

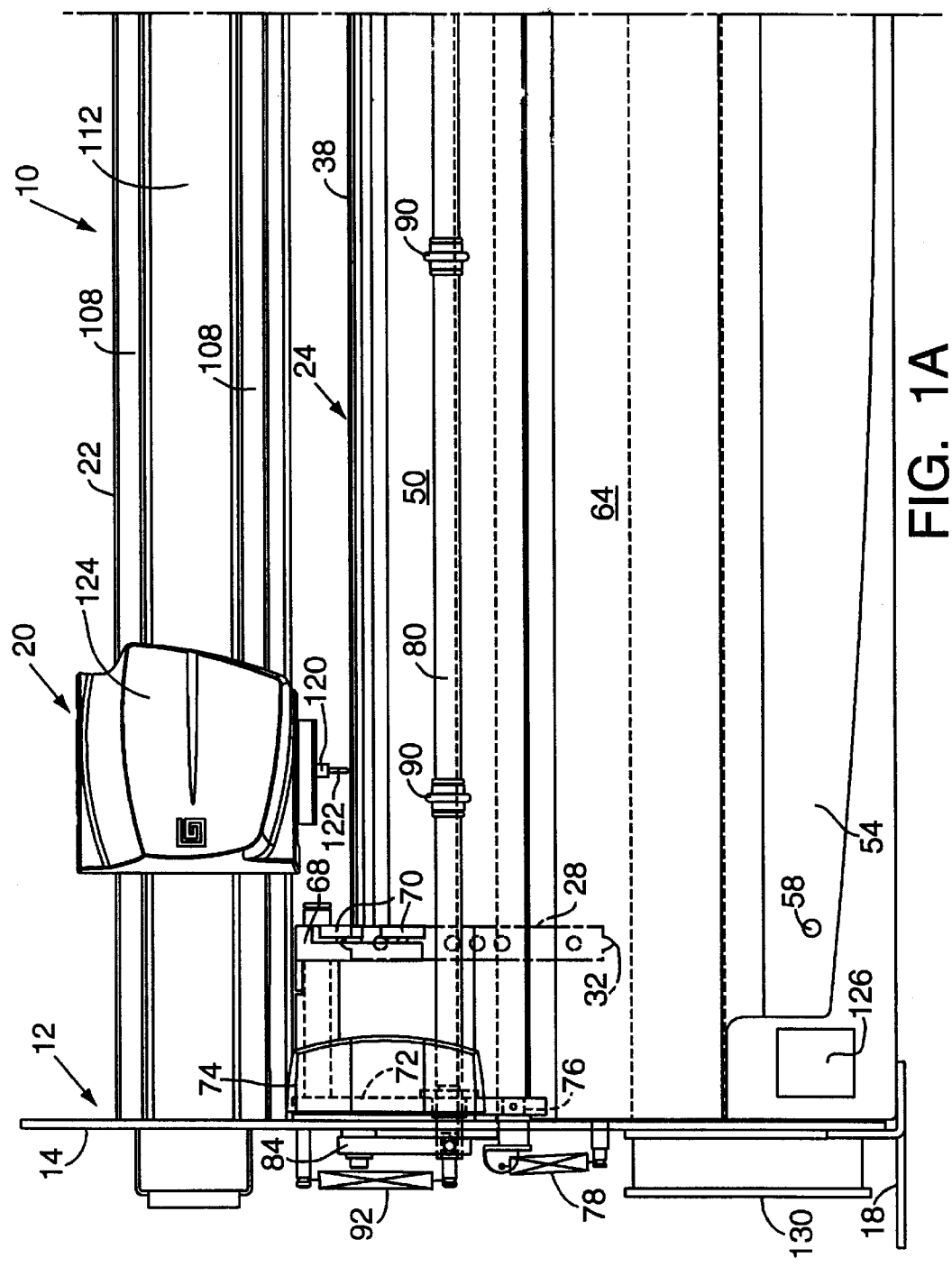

PLOTTER HAVING SPROCKETS FOR DRIVING SHEETS RELATIVE TO A TOOL CARRIAGE AND A FIXED SHEET SUPPORT EXTENDING BETWEEN THE SPROCKETS

FIELD OF THE INVENTION

The present invention relates to apparatus for plotting on sheets, and more particularly, to such apparatus having sprockets received within perforations formed in the sheets for moving the sheets relative to a tool carriage having a pen, knife or like tool for plotting by drawing lines, cutting and/or performing other operations on the sheets.

BACKGROUND INFORMATION

Plotters are used in the computer-generated graphics, sign-making and screen-printing fields for a variety of purposes, including cutting graphic images or characters from sheets of vinyl or other polymeric materials, drawing lines, characters or other graphic images on sheets of paper or polymeric materials, pouncing sheets to form perforated patterns, and embossing sheets to form embossed patterns.

In a typical sprocket-driven plotter, a pair of drive sprockets engage corresponding feed holes formed in the marginal portions of a sheet for moving the sheet relative to a tool carriage supporting a cutting blade, pen or other type of tool. A drum having a diameter approximately equal to the diameter of the sprockets is rotatably mounted between the sprockets for supporting the laterally-extending section of the sheet engaged by the sprockets. The drum is typically mounted on a common sprocket shaft, and a servo motor or stepper motor is drivingly connected to the shaft to rotatably drive both the sprockets and drum and in turn move the sheet relative to the tool supported on the carriage.

One of the drawbacks of this type of prior art plotter is that the inertia generated upon rotating the drum and reflected back to the drive motor increases exponentially with increasing drum radii. Accordingly, for plotters having relatively large drum radii, the inertia reflected back to the drive motor creates a substantial load, and correspondingly, a substantial amount of torque and power may be required to accelerate the sprockets and drum at a desired level. Thus, it would be desirable to reduce the drum diameter in order to decrease the torque required to accelerate the plotter, and in turn decrease the size of the motor, power supply and overall weight of the plotter. However, it is necessary to maintain the drum diameter approximately equal to the sprocket diameter in order to conformably support with the drum the laterally-extending section of the sheet engaged by the sprockets. In addition, the sheets used with such plotters define a predetermined feed-hole pattern for receiving the sprocket pins. A reduction in the sprocket diameter would likely reduce the number of sprocket pins simultaneously engaging the sheets, and in turn negatively affect the ability of the sprockets to drive and steer the sheets.

Accordingly, it is an object of the present invention to provide a sprocket-driven plotter having a relatively low inertia reflected back to the drive motor in order to obtain similar or improved acceleration and plotter throughput without requiring an increase in the size of the motor and/or power supply in comparison to prior art drum-type plotters.

SUMMARY OF THE INVENTION

The present invention is directed to an apparatus for plotting on sheets or like work surfaces by drawing lines or graphics, cutting, or performing a variety of other operations on the sheets. The apparatus comprises two drive sprockets spaced apart from each other and rotatably mounted on a sprocket shaft, and each sprocket is received within feed holes formed in a respective marginal portion of a sheet for engaging a laterally-extending section of the sheet and in turn moving the sheet in a first coordinate direction with rotation of the sprockets. A tool support is spaced adjacent to the laterally-extending section of the sheet engaged by the sprockets, and is movable in a second coordinate direction relative to the sheet for supporting a tool in contact with the sheet and plotting with the tool by, for example, cutting, drawing lines or performing a variety of other operations on the sheet. An elongated sheet support extends in its elongated direction between the two drive sprockets on an opposite side of the sheet relative to the tool support, and is fixed relative to the sprockets for supporting the laterally-extending section of the sheet engaged by the sprockets.

In a preferred embodiment of the invention, the elongated sheet support defines a fixed arcuate support surface extending between the two drive sprockets and being approximately coterminous with the sprockets for uniformly supporting the laterally-extending section of the sheet engaged by the sprockets across substantially its entire width. Preferably, the arcuate support surface defines a plurality of outermost or relatively raised surface areas extending in its elongated direction, and a plurality of recessed surface areas located between the raised surface areas. In operation, the sheets slide in conforming contact with the raised surface areas, and the corresponding recessed surface areas are spaced below the sheets to minimize friction between the arcuate support surface and sheets. In a preferred embodiment, each raised surface area is defined by an arcuate surface segment for further minimizing friction between the arcuate support surface and sheets.

One advantage of the apparatus of the invention is that the elongated sheet support extending between the drive sprockets is fixed in place. Thus, in contrast to the prior art sprocket-driven plotters described above, there is no rotating drum, and therefore the drive motor is required to drive only the sprockets and sheet. Accordingly, substantially less inertia is reflected back to the drive motor, and correspondingly lower levels of torque and power are required to accelerate the apparatus in comparison to other sprocket-driven plotters. It is therefore also possible to achieve improved acceleration and plotter throughput, without requiring an increase in the size of the motor and/or power supply in comparison to other sprocket-driven plotters.

Other advantages of the present invention will become apparent in view of the following detailed description and accompanying drawings.

BRIEF DESCRIPTION OF THE DRAWINGS

FIGS. 1A and 1B are a front elevational view of an apparatus embodying the present invention for plotting on sheets or like work surfaces by drawing lines, cutting or performing a variety of other operations.

DETAILED DESCRIPTION OF THE PREFERRED EMBODIMENTS

Figure 1B:
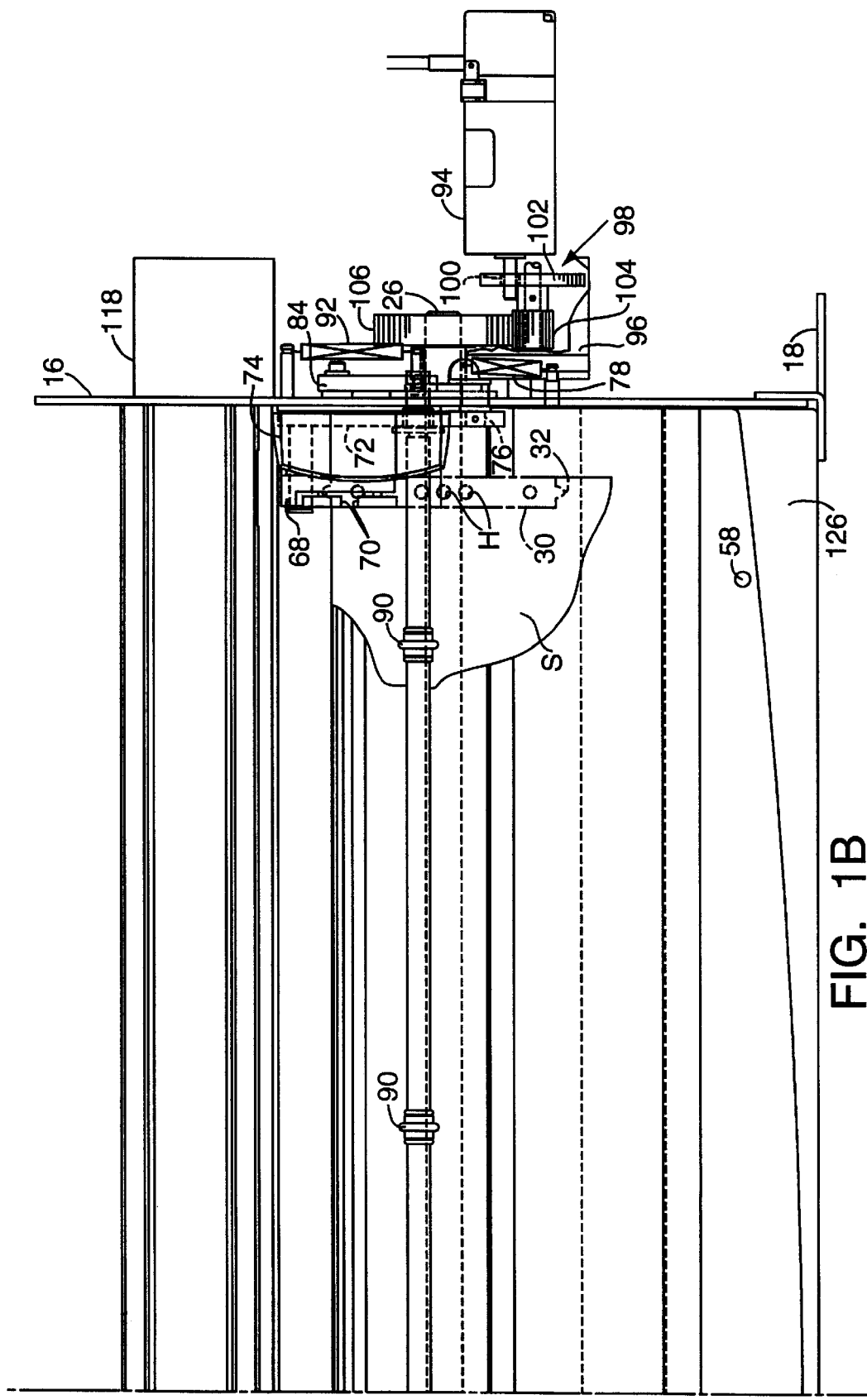

In FIGS. 1A and 1B, an apparatus embodying the present invention for plotting by drawings lines or graphics, cutting and performing a variety of other operations on sheets or like work surfaces or substrates is indicated generally by the reference numeral 10. The apparatus 10 comprises a frame 12 including a left end plate 14, a right end plate 16, and a base tray bracket 18. The base tray bracket may be mounted on a table top, or alternatively, may be mounted on a stand which may include suitable wheels (not shown) for conveniently transporting the apparatus.

A tool carriage 20 is mounted on a y-beam 22 of the frame extending between the left and right end plates 14 and 16, respectively, for movement in the illustrated y-coordinate direction. An elongated sheet support 24 of the frame is spaced below the tool carriage 20, and is fixedly secured to the left and right end plates 14 and 16, respectively. As shown in phantom in FIGS. 1A and 1B, a sprocket shaft 26 is rotatably mounted on each end to a respective end plate and extends in the elongated direction of the sheet support. A first drive sprocket 28 is mounted on the shaft 26 on one side of the sheet support 24 (FIG. 1A), and a second drive sprocket 30 is mounted to the shaft on the opposite side of the sheet support (FIG. 1B).

In accordance with the present invention, each of the sprockets 28 and 30 is received within a series of feed holes formed in a respective marginal portion of the sheet for driving the sheet in the illustrated x-coordinate direction over the fixed sheet support 24. The tool carriage 20 is adapted to carry any of a plurality of tools for plotting on the sheets by performing a variety of operations. The term plotting is used herein to describe, without limitation, any of numerous operations whereby a tool supported on the tool carriage and the sheets or like work surface are moved relative to each other to position the tool at different points locatable by means of coordinates for working on the sheets. For example, the tool may be a blade for cutting the sheets, a pen or other line drawing instrument for drawing lines or graphic images on the sheets, a pounce tool for perforating the sheets, an embossing tool for embossing the sheets, and/or an alignment tool for aligning the tool(s) or tool carriage with registration markings or indicia on the sheets.

As will be recognized by those skilled in the pertinent art, any of numerous different types of sheets or like work materials may be used with the apparatus of the invention, such as paper, cardboard and polymeric sheets, including adhesive-backed vinyl films, metallized polyester films, heat transfer flock, plastisol, masking films for stenciling, screen-printing films, adhesive-coated film laminates, adhesive-coated rubber stencil films, flexible magnetic materials, such as the magnetic material sold by the Assignee of this invention under the trademark GERBERMAG™, and static-cling films. The term sheets is used herein, without limitation, to describe any of numerous different types of sheet-like material which are thin in comparison to their length and breadth, and which may be provided in any of numerous different forms, such as in flat sheets or rolls.

Figure 2:
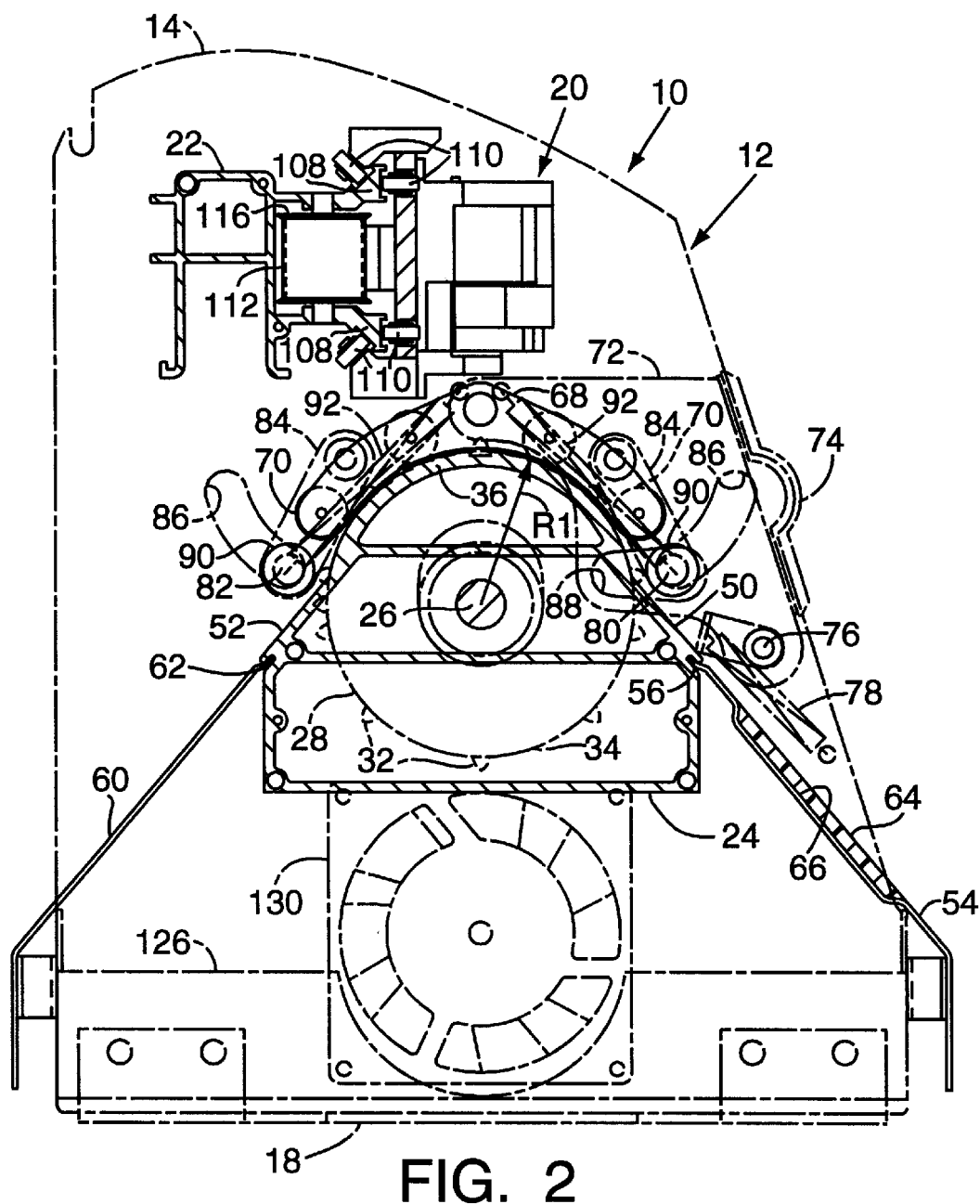
FIG. 2 is a side elevational view of the apparatus of FIGS. 1A and 1B in partial cross section, and with parts removed for clarity, illustrating the drive sprockets, fixed sheet support and bails for maintaining the sheets in conforming contact with the arcuate support surface.
Figure 4:
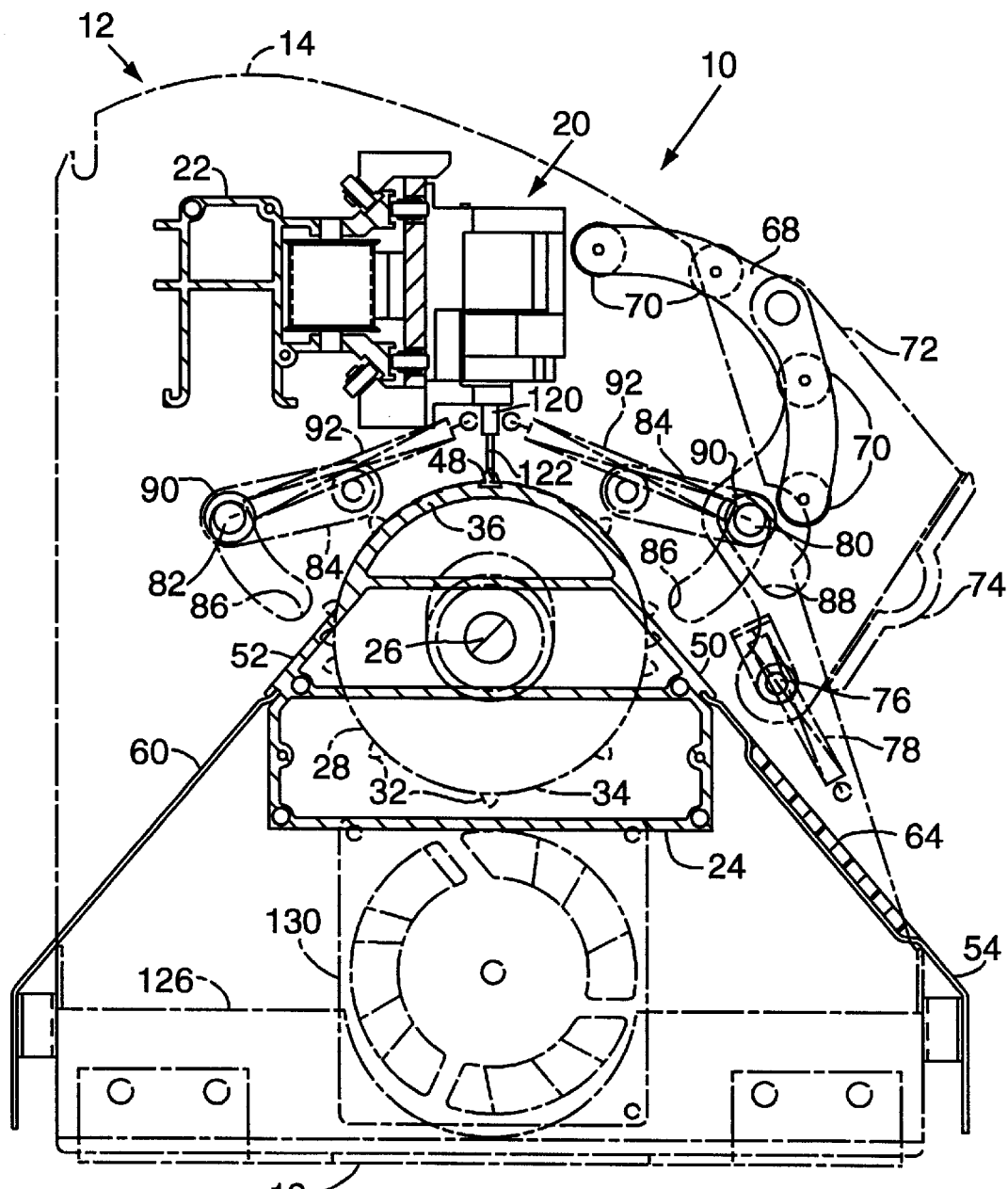
FIG. 4 is another side elevational view of the apparatus of FIGS. 1A and 1B in partial cross section, and with parts removed for clarity, illustrating the bails lifted away from the drive sprockets and fixed sheet support.
Figure 5:
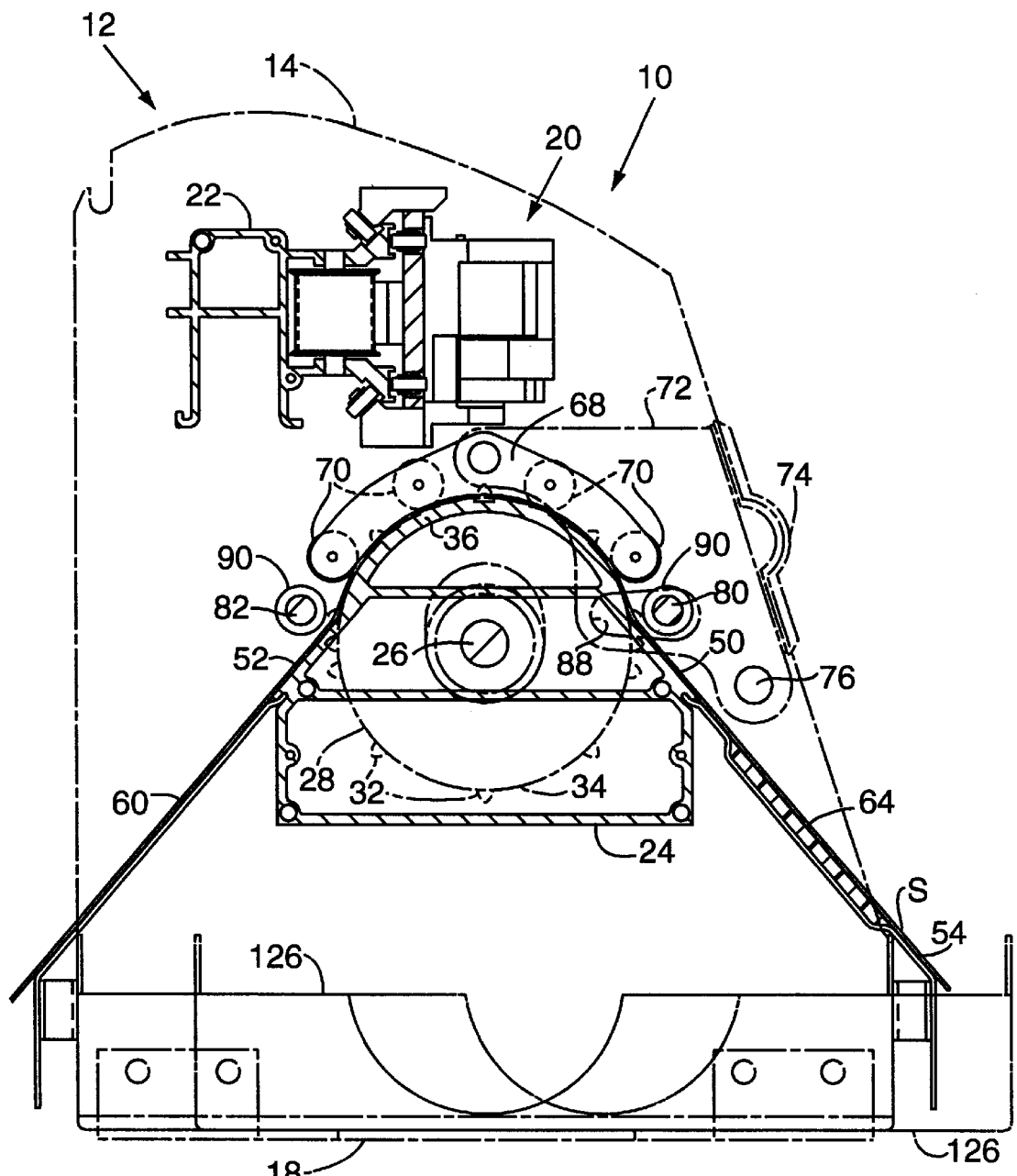
FIG. 5 is a another side elevational view of the apparatus of FIGS. 1A and 1B in partial cross section, and with parts removed for clarity, illustrating the manner in which the bails assist in maintaining the sheets in conforming contact with the drive sprockets and fixed sheet support.

As shown typically in FIGS. 2, 4 and 5, each sprocket 28 and 30 includes a plurality of pins or teeth 32 angularly spaced relative to each other and projecting outwardly from a peripheral surface 34 of the sprocket for contacting and supporting the sheet. As shown typically in FIG. 1B, each sheet "AS" defines a series of feed holes "H" in opposing marginal portions of the sheet for receiving the pins 32 of the sprockets. Preferably, the feed holes H and corresponding sprocket pins 32 are arranged in a pattern readily enabling an operator to visually determine how to properly load the sheet onto the sprockets. This type of arrangement is disclosed, for example, in U.S. Pat. Nos. 4,834,276, 4,867,363 and 4,895,287, each of which is assigned to the Assignee of the present invention, and is hereby expressly incorporated by reference as part of the present disclosure. As will also be recognized by those skilled in the pertinent art, one of the drive sprockets 28 or 30 is preferably slidably mounted on the sprocket shaft 26 in order to allow adjustment of the position of the sprocket in the axial direction of the shaft and thereby facilitate alignment of the sprocket pins with the holes in the sheets.

Figure 3:
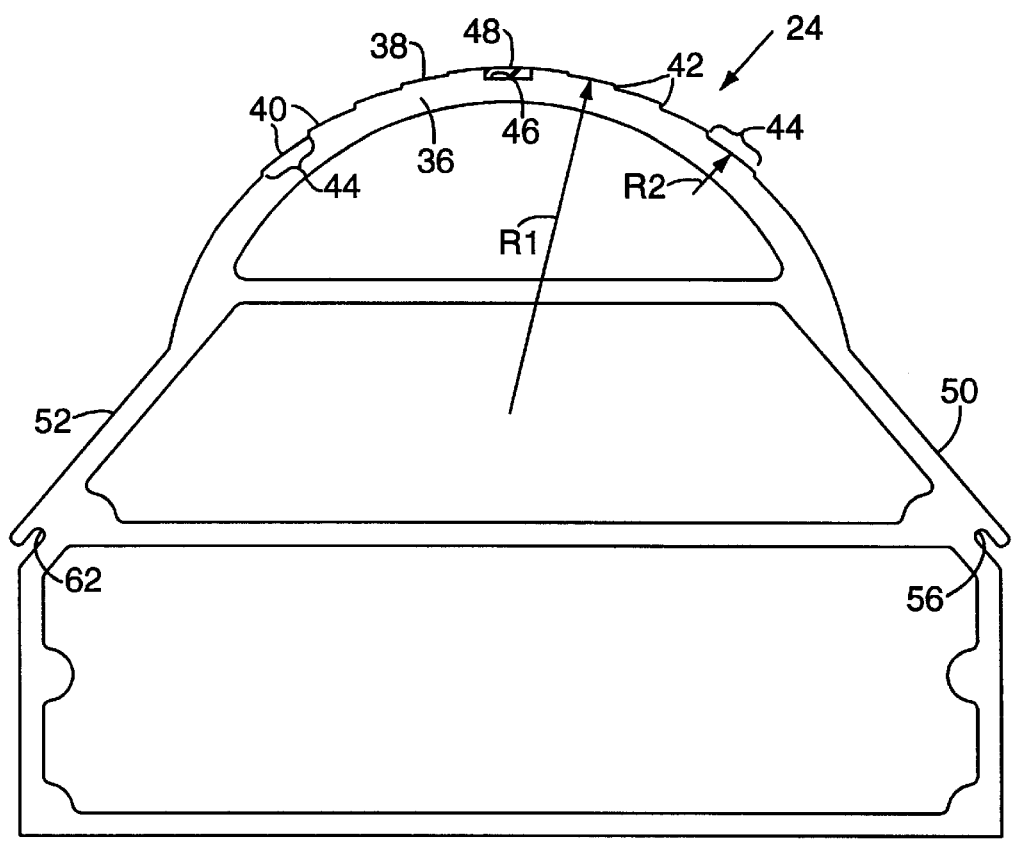
FIG. 3 is a side cross-sectional view of the fixed sheet support of the apparatus of FIGS. 1A and 1B.

As shown best in FIG. 3, the sheet support 24 defines an arcuate segment 36 forming an arcuate sheet support surface 38 extending in the elongated direction of the support between the two drive sprockets 28 and 30 (FIGS. 1A and 1B). The arcuate support surface 38 defines a plurality of outermost or relatively raised surface areas 40 wherein the outermost point of each raised surface area extends along a radius "R1", and a plurality of corresponding recessed surface areas 42 located between the raised surface areas. In the currently-preferred embodiment of the invention, the raised and recessed surface areas are defined by a plurality of contiguous and parallel arcuate surface segments 44 extending in the axial direction of the support from one end to the other. The contour of each arcuate surface segment 44 is defined by a radius "R2", and as shown best in FIG. 3, the arcuate surface segments are formed in seriatim along a curve defined by the radius R1 to create a shingled configuration.

As is described further below, the sheet material S slides in conforming contact with the outermost or relatively raised surface areas 40 of the arcuate segments 44, and the recessed surface areas 42 are spaced below the sheet to reduce friction between the sheet and support surface. As shown in FIG. 2, the radius R1 of the arcuate support surface 38 is approximately equal to the radius of the peripheral surface 34 of each drive sprocket 28 and 30, and the sprockets are aligned with the sheet support so that the arcuate support surface 38 and peripheral support surfaces 34 of the sprockets are coterminous. Accordingly, the laterally-extending section of each sheet S engaged by the drive sprockets is maintained in contact with the sprockets and sheet support across approximately its entire width to facilitate maintaining the sheet in a smooth and uniform condition. However, the recessed surface areas 42 are spaced below the sheet to reduce the surface area of the arcuate support surface 38 in contact with the sheet, and thereby reduce or minimize any friction between the support and sheet.

As also shown in FIG. 3, the sheet support 24 further defines an elongated recess 46 formed in the top center of the arcuate support surface 38 and extending in the elongated direction from one end of the support to the other. An elongated strip of polymeric material forming a relatively hard and low-friction support surface 48 is received within the recess 46 and the exposed face of the strip is approximately coterminous with the outermost regions of the arcuate support surface 38 defined by the radius R1. In the currently-preferred embodiment of the invention, the support surface 48 is formed by a high-density, polyethylene strip having a pressure-sensitive adhesive backing, such as the type sold by 3M, for removably attaching the strip to the base of the recess 46. The high-density polyethylene provides a relatively hard, resilient support surface, so that if the tool carried on the tool carriage 20 (e.g., a knife blade) is mistakenly driven through the sheet S and into engagement with the support surface, the tool may penetrate the strip 48, thus preventing damage to the tool and otherwise preventing damage to the permanent surfaces of the support. The elongated strip 48 may be periodically replaced, if necessary, to ensure the provision of a smooth and undamaged support surface.

As also shown best in FIG. 3, the sheet support 24 further defines a first oblique support surface 50 formed at the base of the arcuate support surface 38 and projecting laterally to one side of the arcuate surface for supporting and guiding a sheet S onto and off of the arcuate support surface. Similarly, a second oblique support surface 52 is formed on the opposite side of the arcuate support surface 38 relative to the first oblique support surface for supporting and guiding a sheet S onto and off of the arcuate surface.

As shown in FIGS. 2, 4 and 5, the apparatus 10 further includes a first oblique support plate 54 connected adjacent to and forming an extension of the first oblique support surface 50. As shown in FIGS. 2 and 3, the sheet support 24 defines a first elongated notch 56 formed at the base of the first oblique support surface 50 for receiving and retaining one end of the first oblique support plate 54. As shown in FIGS. 1A and 1B, the first oblique support plate 54 defines a pair of holes 58 on its front face for receiving fasteners to fixedly secure the plate in the position shown. A second oblique support plate 60 is similarly connected adjacent to and forms an extension of the second oblique support surface 52. As shown in FIGS. 2 and 3, the sheet support 24 defines a second elongated notch 62 formed at the base of the second oblique support surface 52 for receiving and retaining one end of the second oblique support plate 60. Like the first oblique support plate 54, the second oblique support plate 60 defines fastener apertures (not shown) for receiving fasteners to fixedly secure the plate in the position shown.

As shown in FIGS. 1A, 1B and 2, the apparatus 10 further includes a cutting mat 64 received within a recess 66 (FIG. 2) formed in the front face of the first oblique support plate 54. The cutting mat 64 is formed by an elongated strip of resilient polymeric material and extends approximately from one end of the first support plate to the other in its elongated direction. The cutting mat 64 thus extends beneath the entire width of each sheet S and provides a penetrable surface for an operator to cut the sheets with a razor or other cutting tool. In the currently-preferred embodiment of the invention, the cutting mat 64 is a rectangular sheet of plasticized polyvinyl chloride (PVC) having a pressure-sensitive adhesive backing for removably attaching the mat to the base of the recess 66. Accordingly, an operator may engage the cutting mat 64 with a cutting tool when "sheeting off" or terminating a sheet without damaging the tool, and also without damaging other permanent surfaces of the apparatus. If necessary, the cutting mat 64 may be periodically removed and replaced with a fresh mat to provide a smooth and adequate cutting surface.

As shown best in FIGS. 1A and 1B, a pair of holddown bails 68 are mounted adjacent to the pins 32 of the drive sprockets 28 and 30 in order to maintain each sheet S in conforming contact with approximately 120° of both the peripheral support surface 34 of each sprocket and the arcuate support surface 38 of the sheet support extending between the sprockets. As shown typically in FIGS. 2, 4 and 5, each bail 68 includes a plurality of bail wheels 70 rotatably mounted thereon for contacting the portion of the sheet S engaged by the respective sprocket and maintaining the sheet in conforming contact therewith. As shown typically in FIGS. 4 and 5, each holddown bail 68 is pivotally mounted on the free end of a respective bail arm 72 including a bail handle 74, and each bail arm 72 is pivotally mounted on a pin 76 fixedly secured to the respective end plate 14 or 16. Accordingly, as shown typically in FIG. 4, each bail 68 may be lifted away from the respective sprocket by pulling the respective handle 74 in order to allow the sheet S to be mounted on and removed from the sprockets and sheet support. Over-center springs 78 are connected between each bail arm 72 and the respective end plate 14 or 16 to assist in holding the bails downwardly on the portion of the sheet S engaged by the sprockets, while permitting the bails to be lifted away from the sprockets to install or remove a sheet.

Figure 6:
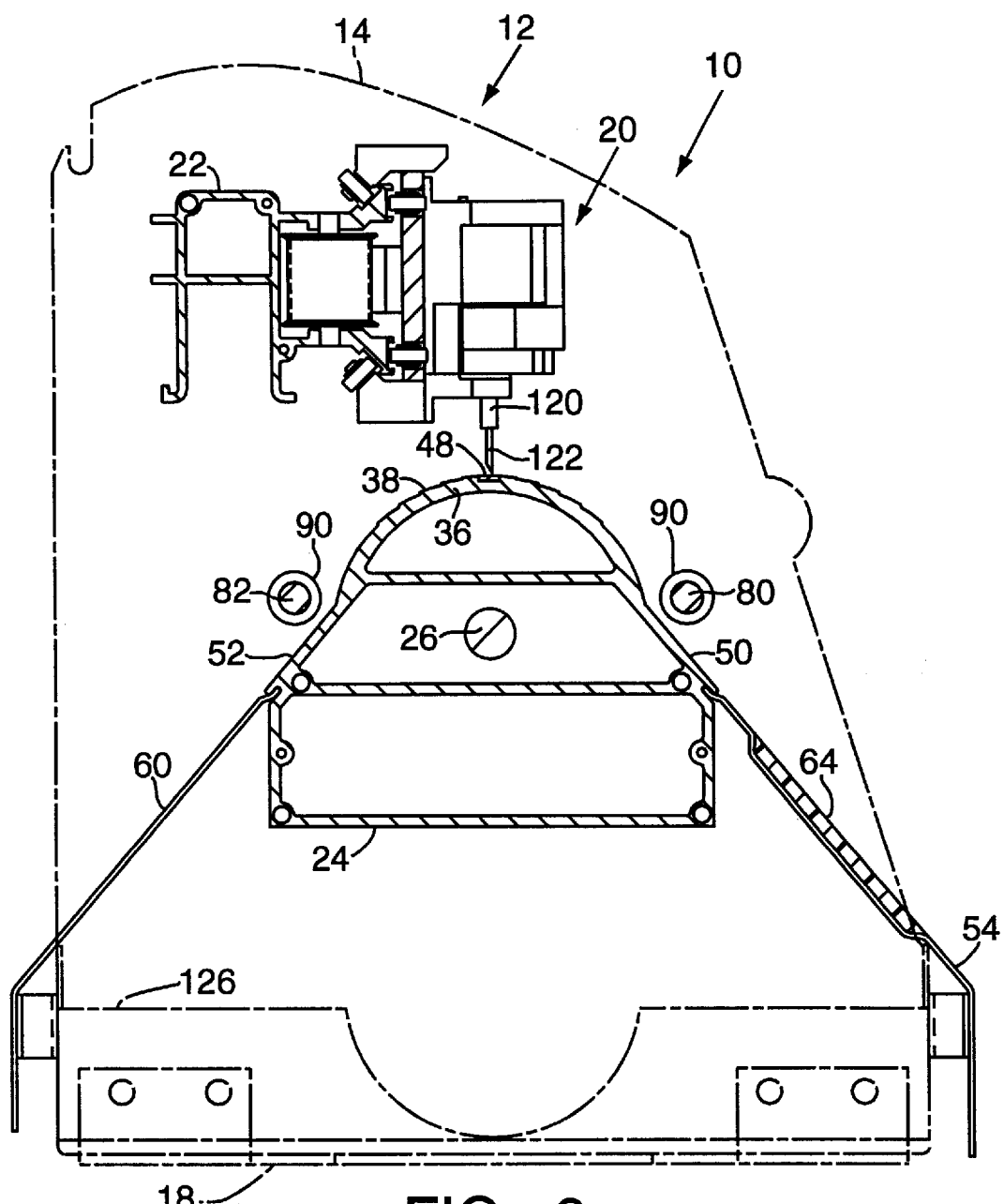
FIG. 6 is another side elevational view of the apparatus of FIGS. 1A and 1B in partial cross section, and with parts removed for clarity, illustrating each hold-down roller in its inward position spaced relative to the respective oblique support surface of the fixed sheet support.

As shown best in FIG. 6, first and second hold-down rollers 80 and 82, respectively, extend between the bails 68 at the supply and discharge points of the sheet support 24. As shown typically in FIG. 4, a pair of hold-down arms 84 are pivotally connected to each end plate 14 and 16, and the ends of each hold-down roller are connected to a respective pair of hold-down arms. Each end plate 14 and 16 also defines a pair of curved slots 86 located on opposite sides of the sheet support 24 relative to each other, for slidably receiving and guiding a respective hold-down roller 80 or 82. Similarly, each bail arm 72 defines an elongated slot 88 for receiving a respective end of the first hold-down roller 80 and for moving the hold-down roller with movement of the bail handle 74. As shown typically in FIGS. 1A and 1B, each hold-down roller 80 and 82 includes a plurality of hold-down wheels 90 rotatably mounted and spaced relative to each other on the roller. Accordingly, the rollers 80 and 82 are each movable between an innermost position, shown typically in FIGS. 2, 5 and 6, with the wheels 90 spaced adjacent to the respective oblique support surface and the sheet S overlying the support surface in order to isolate the laterally-extending section of the sheet S engaged by the sprockets from any sheet movement outside the sprockets, and an outermost position, shown typically in FIG. 4, in order to permit removal or installation of a sheet. This feature is particularly advantageous during relatively high-speed operation of the plotter when the portions of the sheet outside the sprockets may tend to flail. With the rollers 80 and 82 in the innermost position, the wheels 90 will contact and block further movement of the sheets if lifted away from the oblique support surface and will thereby isolate the laterally-extending section of the sheet engaged by the sprockets from such movement. During normal operation, however, the sheet S is spaced away from the wheels 90 as shown so that the wheels and rollers do not normally contact or otherwise interfere with movement of the sheets.

As shown in FIGS. 1A, 1B, 4 and 7, over-center springs 92 are connected between the ends of each hold-down roller 80 and 82 and the adjacent end plate. As shown typically in FIG. 4, movement of the bail handle 74 outwardly simultaneously lifts both the bail 68 and first hold-down roller 80 away from the sheet S to permit removal or installation of the sheet. The second hold-down roller 82, on the other hand, is moved toward and away from the sheet by simply moving the roller through the respective curved slots 86. The over-center springs 92 facilitate in holding the rollers in either the upward or outermost positions when lifted away from the sheets, or in the downward or innermost positions when moved inwardly. As shown typically in FIG. 5, each bail 68 and its bail wheels 70 overly approximately 120° of the respective drive sprocket 28 or 30. Accordingly, the bails 68 maintain the sheet S in conforming contact with approximately 120° of the sprockets 28,30 and sheet support 24 to thereby maintain the laterally-extending section of the sheet engaged by the sprockets in a smooth and uniform condition across its width.

Figure 7:
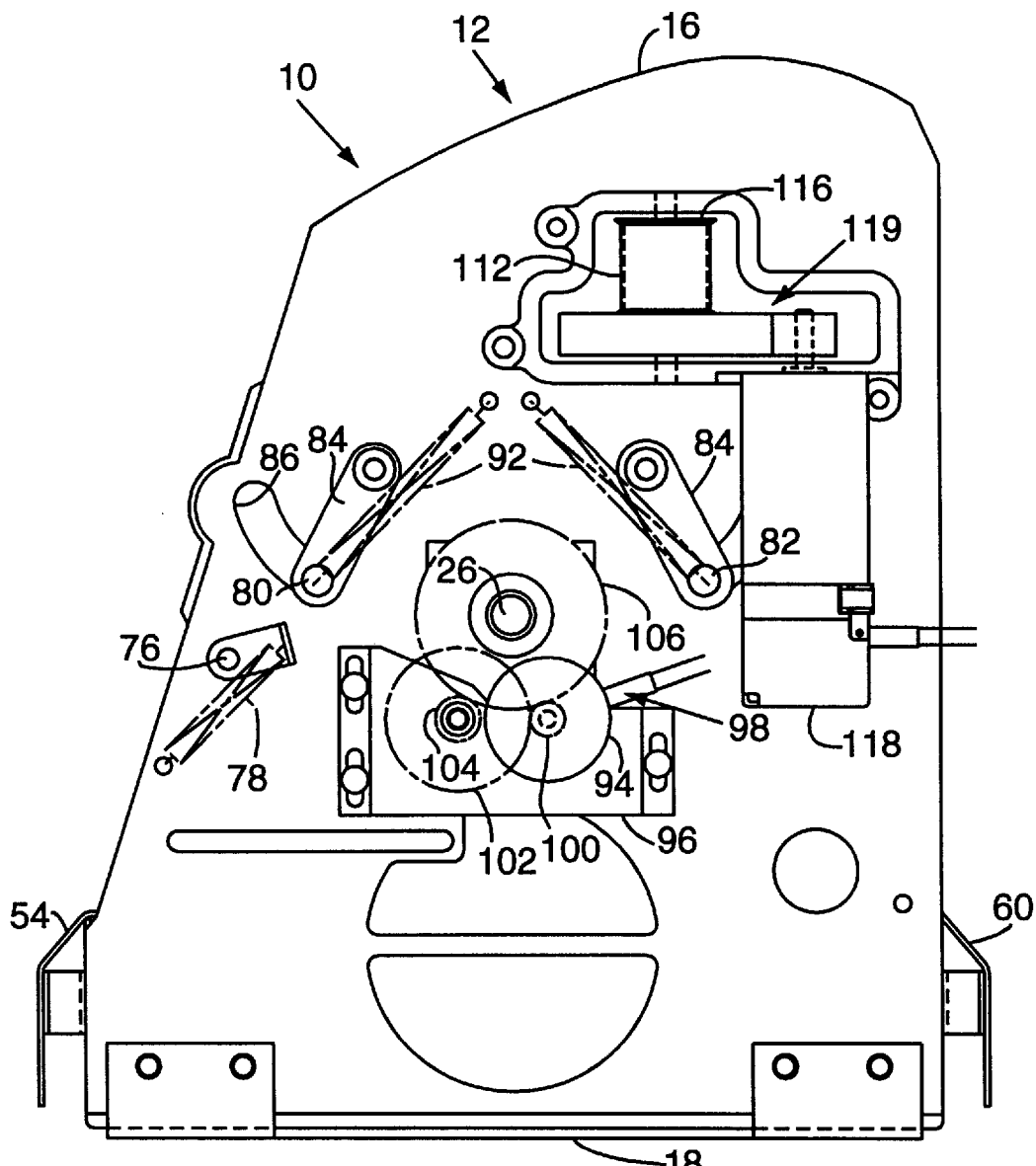
FIG. 7 is a side elevational view of the apparatus taken from the right side of FIG. 1B illustrating the motor and gears for rotatably driving the sprockets.

As shown in FIGS. 1B and 7, a drive motor 94 is mounted on one end to a motor bracket 96 fixedly secured to the end plate 16, and is connected through a suitable gear train 98 to one end of the sprocket shaft 26 for rotatably driving the shaft and sprockets 28 and 30. A motor gear 100 is fixed to the motor shaft and meshed with an idler gear 102, and the idler gear 102 is in turn fixed to a common shaft with an idler pinion gear 104. The idler pinion gear 104 is meshed with a drive gear 106 clamped to the sprocket shaft 26 to rotatably drive sprockets 28,30. The drive motor 94 may be any of numerous drive motors known to those of ordinary skill in the pertinent art, such as an electric servo motor or an electric stepper motor.

One advantage of the apparatus of the present invention is that the sheet support 24 is fixedly secured relative to the drive sprockets 28 and 30, and therefore the drive motor 94 is required to rotatably drive the sprockets and sheet S only. Thus, the drive motor 94 is required to move substantially less mass, and substantially less inertia is generated upon rotation of the sprockets in comparison to the prior art sprocket-driven plotters described above. As a result, the plotters of the invention can achieve the same or improved acceleration and plotter throughput, without increasing the size of the motor and/or power supply in comparison to sprocket-driven plotters. Another advantage of the plotters of the invention is that they can achieve the benefits of improved acceleration and throughput without losing the benefits derived from a sprocket-driven system wherein the sprockets guide and steer the sheets, and maintain relatively precise registration of the sheets with the tool and tool carriage. Yet another advantage of the plotters of the invention is that the sprockets may define the same sprocket diameter and pin configuration as the sprockets used in prior art plotters, thus enabling the plotters of the invention to use the same types sheets and/or sheets defining the same feed hole pattern as those used with prior art sprocket-driven plotters.

As shown in FIG. 2, the y-beam 22 comprises two pairs of ways 108 extending between the two end plates 14 and 16 in the illustrated y-coordinate direction, and the tool carriage 20 includes opposing sets of roller bearings 110 received within the ways for moving the tool carriage along the y-beam. As shown in FIGS. 2 and 7, a drive belt 112 is mounted at each end plate 14 and 16 on a respective pulley 116, and the belt is connected to the tool carriage 20 for movement of the carriage with the belt. As shown in FIG. 7, a y-drive motor 118 is drivingly connected to the adjacent pulley 116 by a suitable gear train 119 to rotatably drive the pulleys 116 and belt 112, and in turn drive the tool carriage 20 in the illustrated y-coordinate direction. As shown in FIGS. 4 and 6, the tool carriage 20 further includes a tool support 120 of a type known to those skilled in the pertinent art which is spaced above and adjacent to the elongated strip 48 (FIG. 6) for supporting a tool 122. As shown typically in FIGS. 4 and 6, the tool 122 may take the form of a blade for cutting the sheets S, or as described above, the tool may be any of numerous different tools known to those skilled in the pertinent art for operating on the sheets. As shown in FIG. 1B, the tool carriage 20 may include a cover 124 for enclosing the components of the carriage.

As shown in FIGS. 1A, 1B and 5, an electronics support tray 126 is slidably mounted on the base tray bracket 18 and extends between the two end plates 14 and 16 for mounting thereon the electronic circuit boards and other electronic components known to those skilled in the pertinent art for controlling operation of the apparatus. The electronic components mounted on the tray 126 are preferably connected to the electric motors and other components of the apparatus with plug-in connectors of a type known to those of ordinary skill in the pertinent art to facilitate rapid and easy connection and disconnection of the components mounted on the tray to and from the other components of the apparatus. A power switch 128 is mounted on one corner of the tray to connect the electronic components of the tray to a power source, such as an electrical outlet, and in turn operate the apparatus.

One advantage of this preferred embodiment of the invention is that the tray 126 may be easily removed from the apparatus (as indicated in broken lines in FIG. 5) by first removing the fasteners (not shown) received through the first and second oblique support plates 54 and 60, respectively, and then removing the support plates. The plug-in or like electrical connectors (not shown) may then be disconnected, and the tray may be pulled outwardly from beneath the sheet support 24 to expose the electronic components. The exposed components mounted on the tray may then be repaired or replaced at the location of the apparatus. Alternatively, the tray containing the damaged or defective components may be removed for repair elsewhere, and if desired, the defective tray may be replaced with a substitute tray during the repair period in order to permit the user to continue operating the apparatus.

An electric fan 130 is mounted on the base of the end plate 14 adjacent to the electronics tray 126, and the end plate defines suitable ventilation apertures (not shown) to permit the fan to draw cooling air across the electronic components mounted on the tray.

Figure 8:
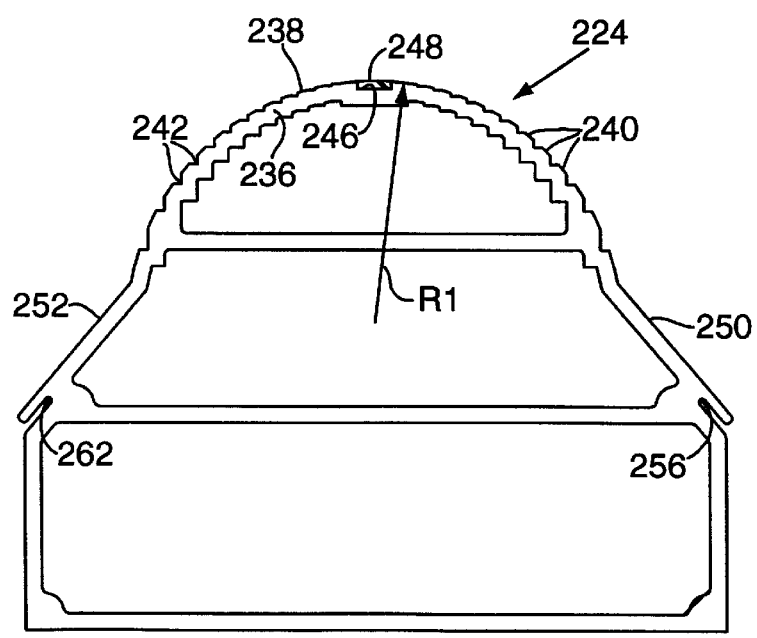
FIG. 8 is a side cross-sectional view of an alternative embodiment of the fixed sheet support of the present invention.

Turning to FIG. 8, an alternative embodiment of the sheet support of the invention is indicated generally by the reference numeral 224. The sheet support of FIG. 8 is similar in many respects to the sheet support 24 of FIG. 3, and therefore like reference numerals preceded by the numeral 2 are used to indicate like elements. The essential difference between the sheet support 24 and the sheet support 224 of FIG. 6, is that the latter defines an arcuate support surface 238 having a plurality of outermost or relatively raised surface areas 240 which are each defined by the radius "R1" and corresponding recessed surface areas 242 in the shape of axially-elongated channels or grooves. The corners or elongated edges of each raised surface area 240 are preferably rounded or chamfered in order to further minimize any friction between the sheets S and the arcuate support surface 238. In the operation of the sheet support 224, the sheets S slide in conforming contact with the outermost surface areas 240, and the corresponding recessed surface areas or channels 242 are spaced below the sheets to minimize any friction between the sheets and support surface.

As will be recognized by those skilled in the pertinent art, numerous changes and modifications may be made to the above-described and other embodiments of the invention without departing from its scope as defined in the appended claims.

For example, it may be desirable to introduce a vacuum within the sheet support 24 or 224 by mounting one or more fans in fluid communication with the interior of the support in order to draw air out of, and thus create a vacuum within the support. A plurality of holes may in turn be formed within the arcuate support surface 38 or 238 of the support to permit the suction forces of the vacuum to facilitate holding the sheets S in conforming contact with the arcuate support surface.

In addition, it may be desirable to form the support surface of the sheet support in any of numerous different configurations in order to minimize or reduce friction between the sheets and the support surface, while simultaneously providing a support for maintaining the laterally-extending section of the sheet engaged by the sprockets in a smooth and uniform condition.

Accordingly, this detailed description of preferred embodiments is to be taken in an illustrative, as opposed to a limiting sense.

What is claimed is:

1. An apparatus for plotting on a sheet defining a plurality of holes in opposing marginal portions of the sheet, comprising:

two drive sprockets spaced apart from each other and rotatably mounted on the apparatus, each sprocket being received within the holes of a respective marginal portion of the sheet for engaging a laterally-extending section of the sheet and for moving the sheet in a first direction with rotation of the sprockets;

a tool support spaced adjacent to the laterally-extending section of the sheet engaged by the sprockets and movable in a second direction relative to the sheet for supporting a tool in contact with the sheet and plotting with the tool on the sheet; and an elongated sheet support extending in its elongated direction between the two drive sprockets on an opposite side of the sheet relative to the tool support, wherein the elongated sheet support is fixedly mounted, and non-rotatable relative to the sprockets for supporting the laterally-extending section of the sheet engaged by the sprockets, and the sprockets are rotatable relative to the elongated sheet support for driving the sheet relative to the support.

2. An apparatus as defined in claim 1, wherein each sprocket defines a first support surface for supporting the sheet on the sprocket, and the sheet support defines an elongated second support surface extending between and approximately coterminous with each first support surface for supporting the laterally-extending section of the sheet between the sprockets.

3. An apparatus as defined in claim 2, wherein the two drive sprockets define an approximately common axis of rotation, and the second support surface defines an elongated axis approximately parallel to the common axis of rotation.

4. An apparatus as defined in claim 1, further comprising a tool blade mounted on the tool support, and wherein the sheet support defines an elongated, penetrable support surface extending between the two drive sprockets for supporting the laterally-extending section of the sheet engaged by the sprockets.

5. An apparatus as defined in claim 4, wherein the penetrable support surface is defined by an elongated strip of polymeric material including an adhesive backing for removably attaching the strip to the sheet support.

6. An apparatus as defined in claim 1, wherein the sheet support defines a plurality of raised surface areas for contacting and supporting the laterally-extending section of the sheet, and corresponding recessed surface areas located between the raised surface areas.

7. An apparatus as defined in claim 6, wherein each raised surface area extends in approximately the elongated direction of the sheet support throughout a substantial elongated portion of the support.

8. An apparatus as defined in claim 7, wherein each recessed surface area defines an elongated groove between adjacent raised surface areas.

9. An apparatus as defined in claim 7, wherein each raised surface area defines an approximately arcuate surface section.

10. An apparatus as defined in claim 1, wherein the elongated sheet support is defined by an approximately arcuate support surface extending in a direction transverse to the elongated direction of the support for contacting the laterally-extending section of the sheet.

11. An apparatus as defined in claim 10, wherein each sprocket defines a peripheral support surface extending along an approximate circle, and the arcuate support surface of the sheet support is approximately defined by the radius of the circle.

12. An apparatus as defined in claim 10, wherein the sheet support further defines a first oblique support surface projecting laterally to one side of the arcuate support surface and oriented at an oblique angle relative to the arcuate support surface for supporting the sheet thereon.

13. An apparatus as defined in claim 12, wherein the sheet support further defines a second oblique support surface projecting laterally on an opposite side of the arcuate support surface relative to the first oblique support surface and oriented at an oblique angle relative to the arcuate support surface for supporting the sheet thereon.

14. An apparatus as defined in claim 10, wherein the arcuate support surface is approximately semi-cylindrical.

15. An apparatus as defined in claim 10, further comprising at least one first bail mounted adjacent to a respective drive sprocket and movable into contact with the sheet engaged by the respective sprocket throughout a substantial angular segment of the sprocket to maintain the sheet in conforming contact with the arcuate support surface.

16. An apparatus as defined in claim 12, further comprising at least one hold-down roller spaced adjacent to the first oblique support surface and extending in the elongated direction of the sheet support for isolating the laterally-extending section of the sheet engaged by the sprocket from movements of other portions of the sheet.

17. An apparatus as defined in claim 12, further comprising a penetrable support surface extending along a substantial elongated portion of the first oblique support surface and engageable with a blade for cutting the sheet.

18. An apparatus as defined in claim 17, wherein the penetrable support surface includes an adhesive backing for adhesively attaching the penetrable support surface to the first oblique support surface.

19. An apparatus as defined in claim 1, further comprising a drive motor drivingly connected to the two drive sprockets for rotatably driving the sprockets and in turn moving the sheet in the first direction.

20. An apparatus as defined in claim 1, further comprising an electronics support tray spaced below and extending adjacent to a substantial elongated portion of the sheet support and being slidably mounted on the apparatus between a first position below the sheet support and a second position spaced to one side of the sheet support for facilitating removal and repair of electronic components mounted thereon.

21. An apparatus as defined in claim 4, wherein the elongated sheet support includes an arcuate support surface extending along a radius, and the penetrable support surface is further defined by the radius.

22. An apparatus for plotting on a sheet defining a plurality of holes in opposing marginal portions of the sheet, comprising:

first means received within the holes of a first marginal portion of the sheet for rotatably engaging the laterally-extending section of the sheet and moving the sheet in a first direction;

second means received within the holes of a second marginal portion of the sheet for rotatably engaging a laterally-extending section of the sheet and moving the sheet in the first direction;

third means for supporting a tool spaced adjacent to the laterally-extending section of the sheet engaged by the first and second means and movable in a second direction relative to the sheet for supporting a tool in contact with the sheet and plotting with the tool on the sheet; and fourth means extending in an elongated direction thereof between the first and second means for supporting the sheet on an opposite side of the sheet relative to the third means, wherein the fourth means is non-rotatable relative to the first and second means for supporting the laterally-extending section of the sheet rotably engaged by the first and second means, and the first and second means are rotatable relative to the fourth means for driving the sheet relative to the fourth means.

23. An apparatus as defined in claim 22, further comprising a tool blade mounted on the third means, and wherein the fourth means defines an elongated, penetrable support surface extending between the first and second means for supporting the laterally-extending section of the sheet engaged by the first and second means.

24. An apparatus as defined in claim 23, wherein the penetrable support surface is defined by an elongated strip of polymeric material including an adhesive backing for removably attaching the strip to the fourth means.

25. An apparatus as defined in claim 22, wherein the fourth means includes an elongated sheet support surface extending in its elongated direction from approximately the first means to the second means.

26. An apparatus as defined in claim 25, wherein the elongated sheet support surface defines a plurality of raised surface areas for contacting and supporting the laterally-extending section of the sheet, and corresponding recessed surface areas located between the raised surface areas.

27. An apparatus as defined in claim 26, wherein each raised surface area extends in approximately the elongated direction of the sheet support surface throughout a substantial elongated portion of the sheet support surface.

28. An apparatus as defined in claim 27, wherein each recessed surface area defines an elongated groove between adjacent raised surface areas.

29. An apparatus as defined in claim 27, wherein each raised surface area defines an approximately arcuate surface section.

30. An apparatus as defined in claim 25, wherein the elongated sheet support surface is defined by an approximately arcuate support surface extending in a direction transverse to the elongated direction of the sheet support surface for contacting the laterally-extending section of the sheet.

31. An apparatus as defined in claim 30, wherein each of the first and second means defines a peripheral support surface extending along an approximate circle, and the arcuate support surface is approximately defined by the radius of the circle.

32. An apparatus as defined in claim 22, wherein the first means includes a first drive sprocket rotatably mounted on one side of the fourth means, and the second means includes a second drive sprocket rotatably mounted on an opposite side of the fourth means relative to the first drive sprocket.

33. An apparatus as defined in claim 32, wherein each drive sprocket includes a peripheral support surface contacting and supporting the respective marginal portion of the sheet, and a plurality of pins spaced relative to each other and projecting outwardly from the peripheral support surface, whereby the pins are received within the holes of the respective marginal portion of the sheet for driving the sheet with rotation of the sprockets.

* * * * *